United States Patent

Nickerson et al.

[15] 3,644,257
[45] Feb. 22, 1972

[54] ACID CURABLE VINYLACETATE COPOLYMER LATEX-POLYVINYL ALCOHOL ADHESIVE

[72] Inventors: Richard Gorham Nickerson, Harvard; Barry Russell Harris, Concord; Morris Breslouf, South Acton, all of Mass.

[73] Assignee: Borden Inc., New York, N.Y.

[22] Filed: Oct. 31, 1968

[21] Appl. No.: 772,407

[52] U.S. Cl. .................. 260/29.6 WB, 156/292, 161/133, 260/29.6 WA
[51] Int. Cl. ................ C08f 15/36, C08f 37/14, C08f 37/18
[58] Field of Search ........... 260/29.6 WA, 29.6 WB; 156/332

[56] References Cited

UNITED STATES PATENTS

| 3,094,500 | 6/1963 | Herman | 260/29.6 |
|---|---|---|---|
| 3,197,429 | 7/1965 | Baatz | 260/29.6 |
| 3,213,051 | 10/1965 | Pink | 260/29.6 |
| 3,220,967 | 11/1965 | Terry et al. | 260/29.6 |
| 3,322,714 | 5/1967 | Martin | 260/31.8 |

*Primary Examiner*—William H. Short
*Assistant Examiner*—E. Nielsen
*Attorney*—John L. Sigalos

[57] ABSTRACT

This invention relates to corrugating adhesives comprising a polyvinyl alcohol and an aqueous emulsion copolymer of vinyl acetate with a minor amount of a coreactive olefinically unsaturated carboxylated monomer; to a process of manufacturing corrugated paperboard having improved water resistance, said process comprising the steps of applying said adhesives between at least one nonfluted liner and one fluted medium and curing the adhesive while it is at a pH below 6; and to the resultant corrugated paperboard.

10 Claims, No Drawings

ACID CURABLE VINYLACETATE COPOLYMER LATEX-POLYVINYL ALCOHOL ADHESIVE

BACKGROUND OF THE INVENTION

Corrugated paperboard is a laminate of at least one fluted medium with at least one nonfluted facing or liner and the adhesive used to effect the lamination is commonly called a "corrugating adhesive." Typically, the medium is made of semichemical pulp or straw, or chestnut, kraft or waste-paper pulp, and the liner is made from heavy weight kraft paper. The simplest form of corrugated paperboard containing one medium and one liner is called "single lined board." "Regular" corrugated board is made with one corrugated medium and two liners; "double wall board" has two corrugated mediums and three liners; "triple wall board" has three corrugated mediums and four liners.

Corrugated board is fabricated on a special machine consisting in its simplest form of a set of intermeshing grooved rolls, a set of adhesive applicator rolls and a hotplate section. The size and number of corrugations per foot of board are controlled by the depth and number of grooves or flutes in the periphery of the corrugating rolls.

The adhesive applicator rolls consist of a glue roll which picks up the adhesive from a trough and a transfer or doctor roll which deposits controlled amounts of adhesive to the touching tips on one side of the fluted medium. Immediately after application of adhesive, the first liner is brought into contact with the side of the corrugated medium which has been treated with adhesive. For regular corrugated board this is followed by similar application of adhesive to the opposite side of the medium and contacting with a second liner. After leaving the glueing stations, the combined board enters the hot plate section where the board is held against platens conveyed by heavy belts.

The common types of corrugating adhesives used heretofore have been based either on sodium silicate or upon starches. Both of these are deficient in that they are considerably sensitive to water and limit end-use to conditions where resistance to moisture is not a factor. By adding certain thermosetting resins such as resorcinol-formaldehyde or urea-formaldehyde to starch formulations, water resistance has been somewhat improved to satisfy certain minimal specifications, such as that there be no spontaneous delamination after 24-hour water soak and that upon flicking the edges with the thumb there be no edge delamination of more than one-quarter inch. However, it is desirable to improve adhesive bond strength sufficiently to show only fiber tear in the delamination strength test.

The application of starches in corrugating is also cumbersome in that careful control is required to achieve the balance of conditions needed both to maintain the circulating adhesive in the proper viscosity range and also to obtain proper bonding. In order to avoid high viscosity associated with aqueous starches in their gelatinized form, it is customary to disperse the major portion of starch in the form of unpasted granules, depending upon heat to produce adequate gelatinization at the adhesive sites. Attempts to mitigate the deficiencies by lowering the speed of operating the corrugating machines have proved to be uneconomical.

The difficulties with starch-based adhesives have recently been aggravated by increasing demands for double and triple walled type of construction and by the use of heavy weight liners. The excessive heat necessary to obtain satisfactory bonding at all interfaces of such constructions limits the corrugating production speed and also damages the quality of the product in that the compounded board has a tendency to be warped. Prior attempts to eliminate these problems by utilizing polyvinyl alcohol and polyvinyl acetate both separately and in combination in place of the starch-based adhesives has heretofore resulted in serious drawbacks.

Adhesives comprising aqueous solutions of either polyvinyl alcohol alone or polyvinyl alcohol modified with certain mordants such as boric acid, aluminum nitrate or zinc nitrate are known and have been tried as corrugating adhesives, but have been unsatisfactory for several reasons. When polyvinyl alcohols of high molecular weight are employed, the viscosity is correspondingly high, giving rise to difficulties in maintaining a consistent and reproducible balance in required properties, including quick grab of adhesives to flute surfaces and ability to deposit sufficiently large amounts of adhesive to potentiate a strong adhesive bond. On the other hand, when attempts are made to overcome the viscosity problem by resorting to polyvinyl alcohol of low molecular weight, the advantage of water resistance is lost.

The aforementioned difficulties with high molecular weight polyvinyl alcohol can be alleviated by carrying out the assembly process at slow speeds, and such procedures on an experimental scale have indeed resulted in paperboard with high water resistance, but the speeds permissible in obtaining such satisfactory results are so slow as to be completely economically unusable in commercial practice.

When latexes of conventional vinyl acetate homopolymers or conventional internally plasticized copolymers of vinyl acetate either alone or with polyvinyl alcohol are tried in the preparation of corrugated board, economically feasible speeds of application are permissible, but the paperboard products obtained are notably deficient in water resistance. In spite of the promising indications that polyvinyl acetate contributes to relatively quick set, adhesives comprising polyvinyl acetate based latexes have thus far not succeeded in producing corrugated paperboard capable of showing only fiber tear in the delamination test.

SUMMARY OF THE INVENTION

An adhesive has now been found for manufacturing corrugated paperboard at high assembly speeds and so improved in water resistance that even after long soaking in water said paperboard does not delaminate at the bonded interface, but exhibits deep paper tearing in tensile tests.

Briefly stated, the present invention entails (1) a corrugating adhesive comprising a polyvinyl alcohol and an aqueous emulsion copolymer of vinyl acetate with a minor amount of a coreactive olefinically unsaturated carboxylated monomer, (2) a process for making corrugated paperboard comprising the steps of applying said adhesive between at least one fluted paper medium and at least one nonfluted paper liner and curing the adhesive while it is at a pH no higher than about 6, and (3) the resultant highly water-resistant corrugated paperboard. It has been found, surprisingly, that the process of this invention can be carried out successfully even on double and triple walled laminates at high rates of machine speed without requiring excessive heat.

DETAILED DESCRIPTION OF THE INVENTION

The essence of the process of this invention is the use of an adhesive which comprises both polyvinyl alcohol and also an emulsion copolymer of vinyl acetate with a minor amount of a coreactive olefinically unsaturated carboxylated monomer.

As to materials, any water-dispersible polyvinyl alcohol may be used; it is, however, preferred to use polyvinyl alcohol which is at least 96 percent hydrolyzed and which has a viscosity between about 5 to about 60 c.p.s. preferably between about 26 and 32 c.p.s. in 4 percent water solution at 20° C. Material of this preferred type contributes to greater water resistance and is more readily adjusted to a formulation with desirable rheological properties.

The vinyl acetate copolymer latex may be prepared by any of the methods of emulsion polymerization used which are well known to those skilled in the art, employing the usual free radical initiating systems, buffering substances, and colloid supporting systems selected from polymeric protective agents such as polyvinyl alcohol, polyvinyl pyrollidone, hydroxy ethyl cellulose and the like and including surfactants, if desired. Since the latex is to be formulated with polyvinyl alcohol, it is preferred to use polyvinyl alcohol also as the protective colloid during polymerization of the latex. Concentration of polyvinyl alcohol and agitation conditions during polymerization are adjusted to achieve a latex particle size in the range between 0.5 and 1.5 microns in diameter. Satisfactory levels of polyvinyl alcohol for protection and particle size control are usually obtainable in the range between about 3 percent and about 5 percent based on weight of vinyl acetate, but smaller or greater amounts may be used. Because of the desirability of relatively low water content in the final formulation with polyvinyl alcohol, it is advantageous to prepare the vinyl acetate copolymer latex at a solids content level between 54 percent and 56 percent.

As to the coreactive olefinically unsaturated carboxylated monomer, this may be any such monomer copolymerizable with vinyl acetate. Although acrylic acid is preferred, the carboxylated monomer may be selected, for example, from methacrylic acid, methacrylic acid dimer, maleic acid, fumaric acid, itaconic acid, aconitic acid, or partially esterified polycarboxylic acids containing ethylenic unsaturation, such as monomethyl itaconate, monobutyl maleate, monoethyl fumarate, monobutyl aconitate, or dimethyl aconitate. The ratio of olefinically unsaturated carboxylated monomer to vinyl acetate may be between about 0.3 percent and about 5 percent by weight. The preferred level is between 1.5 percent and about 2.5 percent by weight.

The ratio of polyvinyl acetate copolymer solids to polyvinyl alcohol may range between 0.5/1 and about 6/1. For best combinations of application and product properties, this ratio is preferred to be between 1/1 and 5/1.

In order to maximize the water-resistant properties of the finished laminated corrugated board product, it is desirable that the drying (curing) take place under acidic conditions. The reason for this is believed to be that physical and chemical cross-linking reactions take place between the hydroxyl groups of polyvinyl alcohol and the carboxyl groups of the vinyl acetate copolymers, resulting in a tighter molecular structure which counteracts the intrinsic water sensitivity of the acetate moities. However, this theoretical interpretation is not to be considered as restricting the operable efficacy of this invention. For best results, it is preferred to have the pH level of the adhesive at between 4.5 and 5 at the time of application, but satisfactory end products may be obtained if the pH is maintained at less than about 6. A pH as low as 3.3 is feasible, but no particular advantage is obtained by correspondingly increasing the acid generating components.

While the carboxylated comonomer may itself be used as partial source of the desired acidity, it is convenient to use also an additional acidifier. Such acidifier, or acidifying agent, may be a strong acid, a weak acid, or a latent acid.

Strong acids include, for example, sulfuric acid, hydrochloric acid, phosphoric acid, sulfamic acid, oxalic acid and formic acid. Small additions of strong acids lower pH by large increments and when they are used alone, great care must be taken to add just sufficient to reach the desired pH level. By the same token, small changes in strong acids during storage of the adhesive effect large increases in pH.

Weak acids include acetic acid, boric acid, sulfurous acid, propionic acid, butyric acid, and the like. Their addition lowers pH by relatively small increments and permits relative ease in reaching the desired pH level. By the same token, small changes in concentration of weak acids occurring during storage cause only small incremental change in pH. This is particularly so when weak acids are components of what is commonly known as a buffer system.

The term "latent acid" as used herein refers to any chemical or chemical system which possesses potential acidity which is not released until one or more of its components is lost by volatility or by a chemical reaction such as hydrolysis. Thus, for example, ammonium chloride, while containing the weak acid, ammonium ion, is also a latent strong acid because heating will decompose the ammonium ion into the volatile ammonia and the hydrogen ion which remains in solution and lowers the pH. Also, salts containing magnesium ion are only partially hydrolyzed by water at room temperature and behave like weak acids, but on being cooked at elevated temperatures these salts precipitate magnesium hydroxide and substantially reduce the pH.

Latent acidifiers which are particularly effective for the purpose of carrying out the instant invention comprise water-soluble salts of aluminum, chromium, zinc, calcium and magnesium. For example, aluminum nitrate, aluminum sulfate, zinc nitrate, chromium nitrate, zinc chloride and magnesium nitrate may be used. Salts of ammonium, such as ammonium chloride or ammonium nitrate, may be used, but are not as effective in achieving a consistent high level of water resistance in the corrugated board.

Another subclass of latent acids comprises the adducts of trialkylamines with Lewis acids such as aluminum chloride, boron trifluoride or sulfur trioxide and other anhydrides as disclosed in U.S. Pat. No. 3,083,185. Such adducts are substantially stable at ordinary temperatures, but decompose or undergo molecular rearrangement at elevated temperatures so that the acidity of the Lewis acid becomes manifest. Examples of trialkylamine-Lewis acid adducts include the 1/1 compounds of triethylamine-aluminum chloride, trimethylamine-sulfur trioxide, trimethylamine-boron-trifluoride and methyl dipropylamine-sulfur trioxide.

The use of latent acids in carrying out the instant invention has the advantage that the proper amount of acidifier may be added to the adhesive far in advance of the actual use of said adhesive, with minimum concern in regard to stability on storage. The adhesive may then be cooked at an elevated temperature for a time sufficient to develop the latent acidity shortly before the adhesive is to be applied. In short, the acidifier may be selected from strong acids, weak acids, or latent acids, but latent acids are preferred.

The adhesive of this invention may also contain minor proportions of other compatible ingredients commonly admixed with corrugating adhesives, such as urea, dicyanodiamide, melamine and various mineral pigments such as clays or bentonite.

The invention will be further described in connection with the following examples of the practice of it wherein proportions are in parts by weight unless specifically stated to the contrary. Initiators, suspending agents, surfactants, buffers and other ancillary agents used for vinyl acetate copolymerization are well known in the art and the invention is not to be construed as limited to those disclosed for the purposes of illustration. Many variations of this invention are possible within the spirit and scope thereof.

EXAMPLE 1 a. Into a 3-liter, three-necked distillation flask equipped with an agitator, reflux condenser, inlets for monomer and initiator solution feeds and nitrogen gas purging, there was added 570 grams of deionized water and 28.5 grams of polyvinyl alcohol (99 percent hydrolyzed; 28 c.p.s. viscosity of 4 percent water solution at 20° C.). The contents of the flask were heated to 90° C. to dissolve the polyvinyl alcohol. The solution was cooled to 50° C.; 0.9 grams sodium bicarbonate and 72.0 grams vinyl acetate monomer was added and the mixture purged with nitrogen gas for 10 minutes. Next, 0.36 grams of ammonium persulfate was added and the mixture heated to 85° C., at which temperature a mixture of 629 grams vinyl acetate and 14.3 grams acrylic acid was added over a 4-hour period. A solution of 0.7 grams ammonium persulfate in 62.4 grams of water was gradually added over the same period. When all of the monomers and initiator solution was added the mixture was heated to 90° C. for 30 minutes and then cooled to room temperature. The product was a stable latex containing 55.2 percent solids with particle size averaging 0.80 microns and residual unreacted vinyl acetate monomer less than 0.3 percent.

b. To 500 grams of the latex of Example 1 (a) was added 500 grams of a 10 percent solution of LEMOL 60–98, a polyvinyl alcohol of the "fully hydrolyzed" type, and 29 grams of a 50 percent solution of aluminum nitrate. The mixture was heated to 85° C. for 20 minutes and then cooled. The resulting mixture was used as the only adhesive in a laboratory-scale corrugating application. The laminate was air dried overnight, then water soaked for 24 hours. Deep fiber tear was visually noted when test specimens were torn.

EXAMPLE 2

A pilot plant batch of polyvinyl acetate emulsion copolymer was made using the composition and procedure of Example 1 (a). The latex product had a solids content equal to 54.9 percent by weight, average particle size 0.89 microns and residual monomer content equal to 0.4 percent.

One drum of this latex was formulated into an adhesive as follows: 14 parts by weight of polyvinyl alcohol of 99.6 percent hydrolyzed grade, 2.8 parts of AST 102 Clay and 1.0 part boric acid were added to 54.6 parts cold water, adjusted to pH 4.8 with 0.1 part sulfamic acid and thoroughly and homogeneously dispersed at 190° F. Then 25 parts of the polyvinyl acetate copolymer emulsion were added with stirring. The mixture was allowed to cool to 150° F. and 2.5 parts urea added.

This adhesive was used in a corrugating operation double-facing a 90-lb. liner with facers meeting government specification V3C. The laminated product had excellent dry bond qualities. Tests made after 24-hour conditioning under standard atmospheric conditions (50 percent R.H. at 80° F.) showed 100 percent paper tear. Wet bonds were found superior to conventional weather-resistant adhesives. After 24-hour immersion in water, tests still showed 100 percent paper tear.

EXAMPLE 3

The following ingredients were combined using a mixing procedure similar to that of Example 2:

| | Parts by Weight |
|---|---|
| Water | 56 |
| Clay (No. AST102) | 11.2 |
| Fully hydrolyzed Polyvinyl Alcohol | 7.5 |
| Latex of Example 2 | 25.0 |

The adhesive, which had a pH of 5.0, was applied in laminating a single facer (meeting government specification V3C) on a 90-lb. weatherproof liner at a machine speed of 285 ft./minute. Excellent dry bond qualities were obtained and the wet bonding was superior to that obtainable with conventional weather-resistant adhesives. After 24-hour dry bond 100 percent paper tear was obtained; likewise, after 24-hour water immersion 100 percent paper tear was obtained.

EXAMPLE 4

The following ingredients were combined, using the mixing procedure of Example 2:

| | Parts by Weight |
|---|---|
| Water | 62.0 |
| Clay (No. AST102) | 5.0 |
| Fully hydrolyzed Polyvinyl Alcohol | 8.0 |
| Latex of Example 2 | 25.0 |

The adhesive had a pH=5.1 and was applied to laminate a V3C single facer to a 90-lb. weatherproof liner at a machine speed of 280 ft./minute. Again, excellent dry bond qualities were obtained and the wet bonding was superior to that obtainable with conventional weather-resistant adhesives. After 24-hour dry bond 100 percent paper tear was obtained; likewise, after 24-hour water immersion 100 percent paper tear was obtained.

EXAMPLE 5

The following ingredients were combined, using the mixing procedure of Example 2:

| | Parts by Weight |
|---|---|
| Water | 58.5 |
| Clay (No. AST102) | 3.0 |
| Fully hydrolyzed Polyvinyl Alcohol | 8.0 |
| Boric Acid | 0.5 |
| Latex of Example 2 | 30.0 |

The adhesive which had a pH=4.9 was applied to laminate a V3C single facer to a 90-lb. weatherproof liner at a machine speed of 290 ft./minute. Again, both dry and wet bond qualities were excellent, 100 percent paper tear being obtained both after 24-hour conditioning and after 24-hour water immersion.

EXAMPLE 6

The procedure of Example 1 (a) is used to make a series of latexes excepting that the acrylic acid is replaced successively by an equal amount of methacrylic acid, maleic acid, fumaric acid, methacrylic acid dimer, and itaconic acid. In each case an adhesive is formulated according to the description in Example 1 (b), heated for 20 minutes and cooled. In each case said adhesive is used as the only adhesive in a corrugating application, the dried laminate is water soaked for 24 hours, and deep fiber tear is visually noted when test specimens are torn.

EXAMPLE 7

The procedure of Example 1 (a) is used to make a series of latexes excepting that the 14.3 grams of acrylic acid is replaced successively by 2 grams, 8 grams, 20 grams, and 35 grams respectively of acrylic acid. In each case a stable latex is obtained which when formulated into an adhesive according to the method of Example 1 (b) and used in a corrugating application results in corrugated paperboard of exceptional strength even after water soaking.

EXAMPLE 8

A series of adhesives is formulated by mixing the latex of Example 1 (a) with "fully hydrolyzed" polyvinyl alcohol (LEMOL 60–98) in proportions such that the weight ratio of latex solids to polyvinyl alcohol is respectively 0.5/1, 1.5/1 and 3.0/1. The series is repeated with various types of partially hydrolyzed polyvinyl alcohol including LEMOL 5–98 and LEMOL 30–98. In each case 1,000 grams of mixture is treated with 29 grams of a 50 percent solution of aluminum nitrate and heated 20 minutes at 85° C. In each case the cooled adhesive is used in a corrugating application and results in corrugated paperboard of exceptional strength even after water soaking. The formulations made with LEMOL 5–98 (having lower molecular weight) are not as resistant to water as the formulations made with higher molecular weight polyvinyl alcohol.

EXAMPLE 9

The latex of Example 1 (a) is used in formulation with polyvinyl alcohol as described in Example 1 (b), except that the aluminum nitrate is replaced successively by equivalents of respectively aluminum sulfate, zinc nitrate, chromium nitrate, zinc chloride, magnesium nitrate and the 1/1 compound of trimethylamine with sulfur trioxide. In each case the adhesive thus formulated when used in a corrugating application results in corrugated paperboard of exceptional strength even after water soaking.

What is claimed is:

1. A corrugating adhesive composition curable at a pH below about 6, and characterized by high water resistance when cured, being an acidic mixture comprising an aqueous solution of a high molecular weight polyvinyl alcohol at least 96 percent hydrolyzed and of viscosity between about 5 and about 60 centipoises in 4 percent concentration in aqueous solution at 20° C., an aqueous latex of a copolymer of vinyl acetate with a minor amount of coreactive olefinically unsaturated carboxylated monomer, said carboxylated monomer being present in an amount between about 0.3 percent and about 5 percent based on weight of vinyl acetate and wherein the ratio of polyvinyl acetate copolymer solids to polyvinyl alcohol is in the range between about 0.5/1 and about 6/1.

2. The adhesive of claim 1, including an acidifier in amount capable of adjusting the pH below about 6 at the time of use.

3. The adhesive of claim 2, in which the acidifier is a strong acid.

4. The adhesive of claim 3 in which the acidifier is a strong acid selected from the group consisting of sulfuric acid, hydrochloric acid, phosphoric acid, sulfamic acid, oxalic acid, formic acid and mixtures thereof.

5. The adhesive of claim 2 in which the acidifier is a weak acid.

6. The adhesive of claim 5 in which the acidifier is a weak acid selected from the group consisting of acetic acid, boric acid, sulfurous acid, propionic acid, butyric acid and mixtures thereof.

7. The adhesive of claim 2, in which the acidifier is a chemical or chemical system which possesses potential acidity which is released by hydrolysis or when one or more of its components is lost by volatility.

8. The adhesive of claim 1 wherein the carboxylated monomer is selected from the group consisting of acrylic acid, methacrylic acid, itaconic acid and mixtures thereof.

9. The adhesive of claim 7 in which the acidifier is a chemical or chemical system selected from the group consisting of water-soluble salts of ammonium, aluminum, chromium, magnesium and zinc and the 1/1 compounds of trialkylamines with respectively sulfur trioxide, aluminum chloride and boron trifluoride.

10. A corrugating adhesive curable at a pH below about 6, and characterized by water resistance when cured being an acidic mixture comprising:
a. 100 parts by weight of an aqueous solution of a high molecular weight polyvinyl alcohol which is at least 96 percent hydrolyzed and of viscosity between about 26 and about 32 centipoises at 20° C. and 4 percent concentration in aqueous solution;
b. between about 100 and about 200 parts of an aqueous emulsion copolymer of vinyl acetate with an amount of acrylic acid between about 1.5 percent and about 2.5 percent, based on vinyl acetate; said copolymer being polymerized in the presence of between about 3 percent and about 5 percent polyvinyl alcohol which is at least 96 percent hydrolyzed; and
c. between about 25 and about 33 parts of aluminum nitrate.

* * * * *